(No Model.)

A. C. MONCRIEF.
RAISIN SEEDER.

No. 425,142. Patented Apr. 8, 1890.

Witnesses.
A. Ruppert
G. B. Towles.

Inventor.
Aralize C. Moncrief
Per
Thomas P. Simpson
atty

UNITED STATES PATENT OFFICE.

ARALIZE C. MONCRIEF, OF BROOKLYN, NEW YORK.

RAISIN-SEEDER.

SPECIFICATION forming part of Letters Patent No. 425,142, dated April 8, 1890.

Application filed January 14, 1890. Serial No. 336,910. (No model.)

*To all whom it may concern:*

Be it known that I, ARALIZE C. MONCRIEF, a citizen of the United States, residing at Brooklyn, in the county of Kings and State of New York, have invented certain new and useful Improvements in Raisin-Seeders; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of my invention is to make a device by which raisins may be easily deprived of their seeds and the latter kept in a body, so as to be readily disposed of, thereby saving much time and labor.

Figure 1:
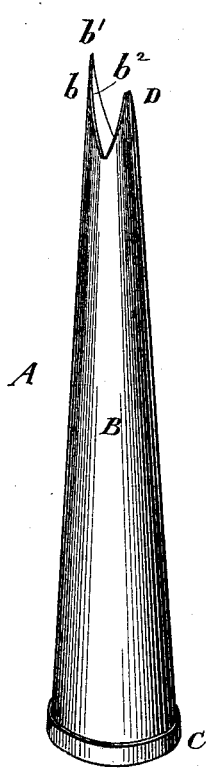
Figure 3:
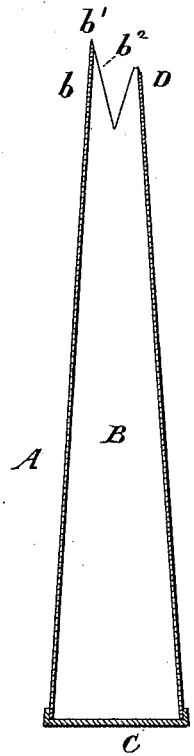
Figure 2:
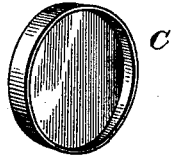

Figure 1 of the drawings is an elevation in perspective, showing my raisin-seeder as an entirety; Fig. 2, a detail view of the detachable bottom, and Fig. 3 a vertical section of the seeder.

In the drawings, A represents the raisin-seeder, consisting of an upwardly-tapering tube B and a detachable bottom C. The tube has at its small end a splitting-knife $b$, which is constructed with a sharp point $b'$, to penetrate the tough skin of the raisin, and a cutting-edge $b^2$ on each side of the point, so as to split the raisin longitudinally. This is done by holding perpendicularly the raisin, so that the point $b'$ will penetrate the skin at the lower end. The raisin is then forced down across the two-edged knife-blade. This splits the raisin longitudinally in the middle and exposes the position of each seed. The raisin is then held to the extractor D and manipulated so as to oust each stone from the fruit and cause it to drop into the tube B. When the latter is full, or nearly so, of the seeds thus kept together, their stickiness requires that they shall be forced out of the tube by pouring water in at the small end thereof after the bottom has been detached.

The advantages of my raisin-seeder are that it not only saves time and labor, but prevents waste and collects all the seeds into one body.

Having thus described my invention, what I claim as new, and desire to protect by Letters Patent, is—

A raisin-seeder consisting of the upwardly-tapering tube B and the detachable bottom C, the said tube being provided at the small end with a splitting-knife, two-edged and sharp-pointed, and an extractor D, all substantially as shown and described.

In testimony whereof I affix my signature in presence of two witnesses.

ARALIZE C. MONCRIEF.

Witnesses:
BERTIE WILLSON,
JAMES L. PHELPS.